April 7, 1959 D. C. HARTKE 2,881,317
PULSED CRYSTAL OSCILLATOR AND METHOD
Filed Aug. 8, 1956 2 Sheets-Sheet 1

INVENTOR.
Dexter C. Hartke
BY Flehr & Swain
ATTORNEYS

PULSED CRYSTAL OSCILLATOR AND METHOD

Filed Aug. 8, 1956 2 Sheets-Sheet 2

INVENTOR.
Dexter C. Hartke

BY Flehr & Swain

ATTORNEYS 2,881,317

PULSED CRYSTAL OSCILLATOR AND METHOD

Dexter C. Hartke, Saratoga, Calif., assignor to Hewlett-Packard Company, Palo Alto, Calif., a corporation of California Application August 8, 1956, Serial No. 602,740
11 Claims. (Cl. 250—36)

This invention relates to sinusoidal wave form generators, and more particularly to pulsed crystal oscillators and method.

The use of continuous sine waves for measuring timing intervals between recurrent events requires that the earliest event be synchronized with the sine wave. In many applications, events are not periodic and it is impossible to synchronize the event with the sine wave. The error introduced in the measurement of interval may be as great as the time for one period of oscillation.

To overcome the difficulties encountered in synchronizing an event with a continuous wave, pulsed sinusoidal oscillators have been employed to generate the timing wave form. In these oscillators the first event initiates the pulsed oscillations. However, it is difficult to start a pulsed oscillation without having distortion in the first few cycles of the pulse.

For high accuracy in the measurement of time intervals it is desirable to employ crystal oscillators. Pulsed crystal oscillators in the prior art generally include a crystal connected in one leg of a bridge circuit. Gating means serve to form pulses which excite the bridge. The natural crystal frequency of the crystal appears at the output of the bridge and is amplified while the other frequencies are balanced out. Means are provided for damping the oscillations by application of negative feedback upon termination of the gating pulses. Frequencies near the crystal frequency are not balanced out and distortion results in the beginning of the first few cycles of oscillation. The amplitude of the pulses tends to decay, and the decay becomes appreciable when long periods of crystal controlled oscillations are required.

It is an object of the present invention to provide an improved pulsed crystal oscillator and method.

It is another object of the present invention to provide an improved pulsed crystal oscillator and method in which the pulse amplitude remains constant over the pulse duration.

It is another object of the present invention to provide an improved pulsed crystal oscillator and method in which means are provided for correcting the distortion in the first few cycles of the crystal oscillations.

It is a further object of the present invention to provide a pulsed crystal oscillator and method in which the pulsed sinusoidal oscillations are relatively free of distortion and have a constant amplitude.

These and other objects of the invention will appear more clearly from the following description and accompanying drawings.

Referring to the drawings.

Generally, the pulsed crystal oscillator comprises a gate which serves to initiate oscillations in a bridge circuit which includes a crystal in one leg thereof. Positive feedback means serve to maintain the amplitude of the pulsed oscillations constant. Negative feedback means serve to damp the oscillations at the termination of the pulse. The output from a ringing circuit is mixed with the output of the bridge circuit to provide a pulsed sinusoidal oscillation which is relatively free of distortion.

Figure 1:
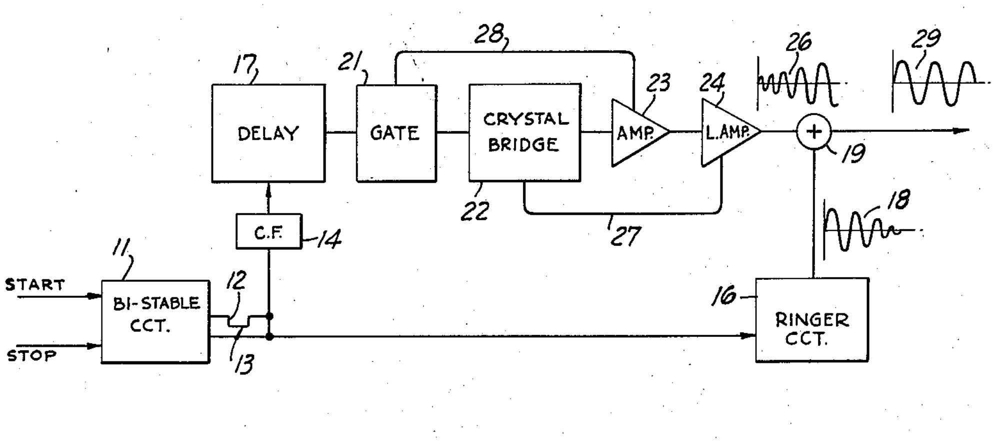
Figure 1 is a block diagram of the pulsed crystal oscillator circuit of my invention.

Referring to Figure 1, the signal which starts the pulsed sinusoidal oscillations is applied to the start line of a bi-stable circuit 11. Upon application of the signal to the bi-stable circuit, the circuit switches into one of its stable states thereby forming a voltage step, such as illustrated at 12 on the square wave 13. The pulse 13 is applied to the cathode follower 14 and the ringer circuit 16, to be presently described. The cathode follower 14 serves to isolate the bi-stable circuit from the delay line 17 and to provide a suitable input impedance thereto.

The pulse 13 excites the ringer circuit 16 which produces damped sinusoidal oscillations such as illustrated at 18. The damped sinusoidal oscillations are applied to the adder 19. After a delay introduced by the delay line 17, the pulse 13 is applied to the gate 21 and serves to close the same. This provides a pulsed excitation to the crystal bridge 22 which causes the crystal to oscillate. As will be presently described, the pulse is applied to the input terminals of the bridge. The components of the bridge are chosen whereby only the natural frequency of the crystal will appear at the output terminals, while the other frequencies are balanced out. However, pulses near the crystal frequency are not balance out and cause some distortion at the beginning of the pulsed oscillations, as previously described.

The output of the crystal bridge is applied to an amplifier 23 which serves to amplify the pulsed sinusoidal oscillations. The output of the amplifier 23 is further amplified by the limiting amplifier 24 and appied to the adder 19. The pulsed oscillation is of the type shown at 26. The amplified signal from the limiting amplifier 24 is applied as a positive feedback signal along the line 27 to the bridge 22. The positive feedback serves to maintain the amplitude of the pulsed oscillations constant throughout the pulse period. The limiting amplifier serves to control the amplitude of the feedback signal to stabilize the output of the bridge.

A negative feedback signal is fed back along the line 28 to the gate 21. The signal is not applied to the crystal bridge when the gate is cut off by the pulse 13. However, the signal is amplified and applied to the bridge 22 and serves to rapidly damp out the oscillations when the pulse terminates.

To control the phase of pulsed sinusoidal oscillations applied to the adder 19, a suitable delay is introduced between the application of ringer oscillations 18 and crystal oscillations 26. Thus, a suitable delay circuit may be introduced between the bridge output and the adder. In the embodiment shown one delay line 17 serves to delay application of pulses to the gate 21 for a predetermined controllable time whereby the phase of the damped sinusoidal oscillations 18, and those of the oscillations 26 may be adjusted so that the waves combine in the adder 19 to form a pulsed sinusoidal oscillation 29 which is relatively free of distortion.

The pulsed sinusoidal oscillation 29 is suitable for application to counting circuits or other circuits.

The pulsed sinusoidal oscillations are extinguished by application of a stop pulse to the bi-stable circuit 11. This terminates the output pulse 13. The gate 21 is opened and the feedback along the line 28 serves to rapidly damp the bridge oscillations. The circuit is then in readiness for application of the next starting pulse.

Figure 3:
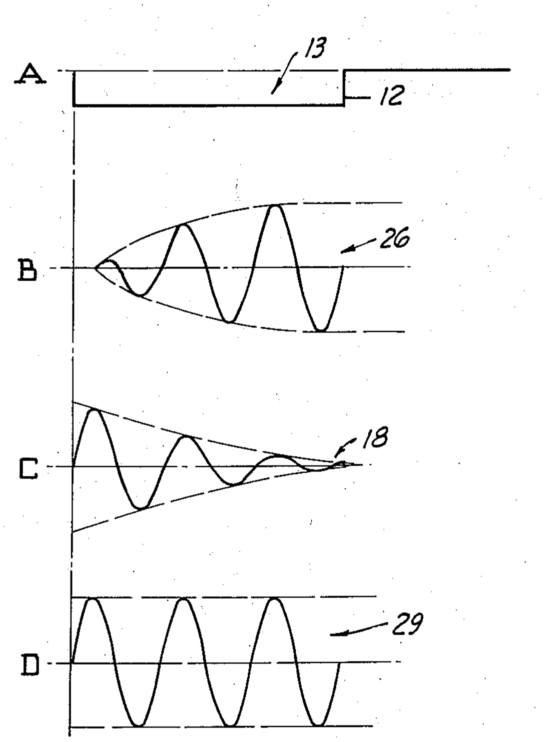
Figure 3 shows the pulses appearing at various points in the circuit of Figures 1 and 2.

Referring particularly to Figure 3, the pulse output 13 of the bi-stable circuit is shown in Figure 3A. The pulsed sinusoidal oscillations from the amplifier 24 are shown in Figure 3B. The beginning few cycles have distortion as schematically illustrated. The decaying sinusoidal oscillations from the ringer 16 are shown in Figure 3C, and the combined output from the adder 19 is shown in Figure 3D.

Thus it is seen that the circuit serves to form a pulsed sinusoidal oscillation which is zero until the beginning of the interval to be measured, becomes sinusoidal for a predetermined time interval, and returns to zero. The circuit is then in readiness for the start of the next timing interval.

Figure 2:
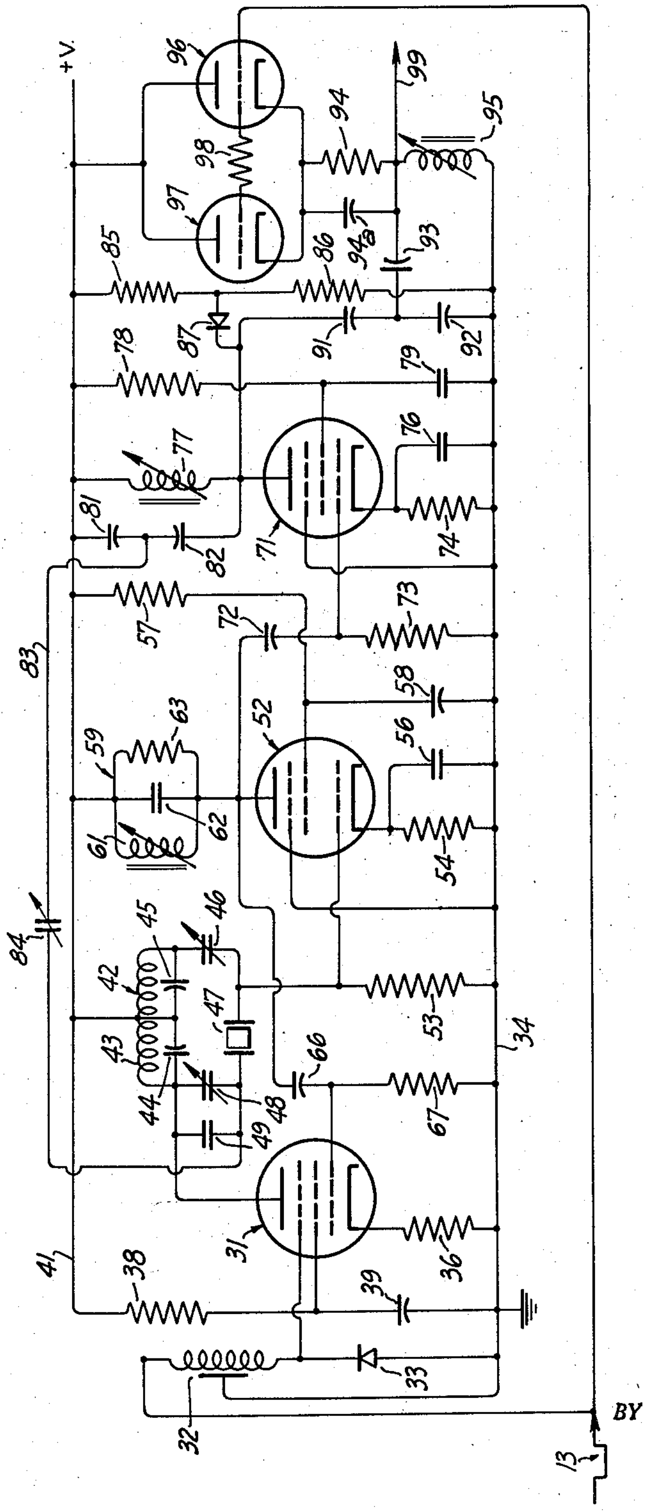
Figure 2 is a detailed circuit diagram of the pulsed crystal oscillator illustrated in Figure 1.

Referring now more particularly to the circuit shown in Figure 2, the controlling pulse is applied to the suppressor grid of the gating tube 31 through the delay line 32 which serves to delay application of the pulse for a predetermined time after application of a pulse to the ringer circuit, as will be presently described. A clamping diode 33 is connected in series with the delay line 32 to the line 34. The common terminal of the delay line 32 and clamping diode 33 is connected to the suppressor grid of the tube 31. The cathode of the tube 31 is connected to the line 34 through the cathode resistor 36. The screen grid of the tube 31 is connected to the common terminal of the serially connected resistor 38 and capacitor 39 which are connected between the lines 34 and 41. The plate of the tube is connected to the input of the crystal bridge designated generally by the reference numeral 42.

A center tapped inductor 43 forms two legs of the bridge. The center tap is connected to the line 41. Capacitors 44 and 45 are connected in series between the ends of the inductor 43 and their common terminal is connected to the center tap of the inductor 43. An adjustable capacitor 46 forms another leg of the bridge, and the crystal 47 and trimming capacitors 48 and 49 form the fourth leg of the bridge. The plate of the tube 31 is connected to the junction of the capacitors 48, 49 and the inductor 43. The adjustable capacitor 46 provides means whereby the bridge may be balanced for all frequencies other than the crystal frequency.

The common terminal of the adjustable capacitor 46 and crystal 47 is connected to the control grid of the amplifier tube 52 and to one end of the resistor 53 which has its other end connected to the line 34. The suppressor grid of the tube 52 is directly connected to the line 34. The cathode is connected to the line 34 through the cathode resistor 54 and by-pass capacitor 56. The screen grid is connected to the common terminal of the serially connected resistor 57 and capacitor 58 which are connected between the lines 34 and 41. The plate of the tube is connected to line 41 through the tuned circuit designated generally by the reference numeral 59. The tuned circuit comprises the parallel combination of adjustable inductor 61, capacitor 62 and resistor 63.

The output of the tube is applied as a negative feedback signal to the control grid of the tube 31. The series combination of capacitor 66 and resistor 67 are connected between the plate of tube 52 and line 34. The common terminal of the series combination is connected to the control grid.

The output from the tube is also applied to the control grid of the amplifier tube 71 through a resistance-capacitance network comprising a capacitor 72 and resistor 73. The suppressor grid of the tube 71 is directly connected to the line 34, the cathode is connected to the line 34 through the cathode resistor 74 and by-pass capacitor 76. The plate is connected to the line 41 through the adjustable inductor 77. The screen grid is connected to the common terminal of the serially connected resistor 78 and capacitor 79 which are connected across the lines 34 and 41.

A capacitive divider circuit comprising capacitors 81 and 82 is connected between the plate of tube 71 and line 41. The circuit serves to supply a positive feedback signal to the crystal bridge 42 along the line 83 which is connected between the bridge and common terminal of the capacitors. The variable capacitor 84 connected in the line 83 provides means for adjusting the positive feedback.

Amplitude limiting means are also connected to the plate. A resistive voltage divider circuit comprising series resistors 85 and 86 is connected between the lines 34 and 41 and serves to apply a predetermined potential to one terminal of the limiting diode 87. The other terminal of the diode is connected to the plate lead. The amplitude limiting circuit serves to limit the amplitude of the output of the tube 71 whereby the positive feedback signal is maintained at a constant amplitude. This stabilizes the operation of the bridge 42.

The amplified output of the tube 71 is applied to the ringing circuit through the serially connected capacitors 91 and 92. The common terminal of the capacitors is connected to one end of the capacitor 93 and the other end of the capacitor 93 is connected to the adjustable inductor 95. The capacitor 93 is also connected to the common cathode resistor 94 and by-pass capacitor 94*a* of the tubes 96 and 97. The plates of the tubes are directly connected to the line 41 and the control grids are connected through the resistor 98 and adapted to receive pulses from the associated bistable circuit.

Operation of the circuit is as follows: In its non-oscillatory condition, the gate 31 has its tube biased to conduct. The tubes 96 and 97 are also biased to conduct. Upon application of the negative pulses 13 to tubes 96 and 97, they are cut off. The pulse excitation serves to excite the ringer circuit comprising the inductor 95 and the capacitors 92 and 93. This produces a damped sinusoidal oscillation which appears at the line 99. After a predetermined delay, which is controlled by the delay lines 32, a pulse is applied to the suppressor grid of the gate tube. This causes the gate to close and pulse excitation is applied to the crystal bridge 42. As is well known, a crystal may be represented by a capacitor for all frequencies other than the resonant frequency of the crystal. The bridge may be balanced for all frequencies other than the resonant frequency whereby none of the frequencies in the pulse will appear at the output of the bridge except the crystal frequencies and frequencies near thereto.

The output of the crystal bridge which is at the crystal frequency is amplified by the amplifier 52. A negative feedback signal is supplied to the control grid of the tube 31. However, since the tube 31 is not conducting, this signal is not amplified and applied to the bridge until termination of the control pulse. The output of the amplifier 52 is amplified by the amplifier tube 71 and applied across the capacitors 91 and 92 to the line 99.

The limiter circuit connected in the output circuit of the tube 71 serves to limit the amplified signal. The capacitor divider serves to feed back a predetermined fraction of the output voltage to the bridge circuit. The phase of the feedback signal is such that the feedback is positive and serves to maintain the amplitude of the bridge oscillations constant.

The delay line 32 provides means for controlling the instant when the pulsed crystal voltage will appear at the adder. As previously described, by properly adjusting the delay, the damped sinusoidal oscillations and the pulsed crystal oscillations will combine in such a manner as to give a pulsed oscillation on the line 99 which is free of distortions.

When the pulse 13 terminates, the tubes 96 and 97 again conduct and the gate 31 is opened. The negative feedback signal is amplified and applied to the crystal circuit. The crystal oscillations are immediately damped and the circuit is in readiness for the next pulsed output.

A pulsed crystal oscillator of the type shown and described was constructed.

The tubes were of the type described by manufacturer's specification as follows:

| | |
|---|---|
| Tube 31 | 6AS6. |
| Tube 52 | 6AH6. |
| Tube 71 | 6AH6. |
| Tubes 96 and 97 | Twin triode 5965. |

The crystal was of the type known by manufacturer's specification as AT Cut, 1 mc. quartz crystal.

The other components had values as follows:

| | |
|---|---|
| Delay line 31 | 600Ω, .25 μsec. delay. |
| Diodes 33, 87 | IN34. |
| Resistors: | |
| R36 | 150Ω. |
| R38 | 12KΩ. |
| R53 | 100KΩ. |
| R54 | 180Ω. |
| R57 | 100KΩ. |
| R63 | 10KΩ. |
| R73 | 100KΩ. |
| R74 | 100Ω. |
| R78 | 56KΩ. |
| R85 | 100Ω. |
| R86 | 18KΩ. |
| R94 | 100Ω. |
| R98 | 470Ω. |
| Capacitors: | |
| C39 | .005 μf. |
| C44 | 390 μμf. |
| C45 | 390 μμf. |
| C46 | 1.5–7 μf. |
| C48 | 5–20 μf. |
| C49 | 15 μf. |
| C51 | 390 μμf. |
| C56 | .02 μf. |
| C58 | .005 μf. |
| C62 | 56 μμf. |
| C76 | .02 μf. |
| C79 | .005 μf. |
| C81 | 56 μμf. |
| C82 | 5 μμf. |
| C84 | 1.5–7 μf. |
| C91 | .240 μμf. |
| C92 | .01 μf. |
| C93 | .240 μμf. |
| Inductors: | |
| L43 | 80/120 μh. |
| L61 | 600/1200 μh. |
| L95 | 80/120 μh. |

The pulsed oscillator was operated. A suitable oscillscope was employed to observe the waveforms which are schematically shown in Figures 3A–3D. Duration of pulsed sinusoidal oscillations as long as 1 sec. were obtained without any decay in the amplitude.

Thus it is seen that I have provided an improved circuit for generating pulsed sinusoidal oscillations. The circuit will generate pulsed oscillations having any desired duration since positive feedback serves to maintain the amplitude of the oscillations constant. Distortions introduced during the first few cycles of a pulsed crystal oscillation are compensated for by adding the crystal oscillations with damped oscillations. As a result, a pulsed sinusoidal oscillation which begins at zero which is relatively free of distortions is provided. As previously described, pulsed oscillations of this type are important in measuring time intervals.

I claim:

1. A pulsed crystal oscillator comprising a bridge circuit having input and output terminals and including a crystal in one leg thereof, means connected to the input of said bridge and adapted to excite the same to form sinusoidal oscillations, amplifying means serving to amplify the output of said bridge, means for applying positive feedback to said bridge whereby the amplitude of said bridge output remains constant, means serving to generate damped sinusoidal oscillations, means serving to add said bridge oscillations and said damped oscillations to produce oscillations free of distortion.

2. A pulsed crystal oscillator of the type in which oscillations are controlled by gating pulses comprising a bridge circuit, said bridge circuit having input and output terminals and including a crystal connected in one leg thereof, gate means connected to the input of said bridge, said gate means adapted to become non-conducting upon application of a gating pulse, whereby the bridge circuit is excited to generate sinusoidal oscillations, means connected to the output of said bridge and serving to amplify the sinusoidal oscillations, positive feedback means connected between said amplifying means and bridge and serving to maintain the amplitude of the oscillations, means serving to generate damped sinusoidal oscillations in response to said gating pulses, and means serving to add said amplified bridge oscillations and said damped sinusoidal oscillations to produce pulsed sinusoidal oscillations which are relatively free of distortion.

3. A pulsed crystal oscillator of the type in which oscillations are initiated and terminated by a gating pulse comprising a bridge circuit having input and output terminals and a crystal connected in one leg thereof, gate means connected to the input terminal of said bridge, said gate means adapted to become non-conducting upon application of a gating pulse to thereby excite the bridge to generate sinusoidal oscillations, means for amplifying the bridge output, positive feedback means connected between said amplifying means and said bridge whereby the amplitude of said oscillations is maintained constant, means serving to generate damped sinusoidal oscillations in response to said gating pulse including elements of inductance and capacitance, and means serving to add said bridge oscillations and said damped oscillations to produce pulsed oscillations which are relatively free of distortion.

4. Apparatus as in claim 3 together with delay means serving to delay the application of bridge oscillations to the adding means whereby the phase relationship of the damped and bridge oscillations may be controlled.

5. Apparatus as in claim 3 together with a delay line connected to the control terminal of said gate means whereby the gating pulse is delayed a predetermined time prior to application to the gate, whereby the phase relationship of said damped oscillation and said bridge oscillations may be controlled.

6. A pulsed crystal oscillator of the type in which the oscillations are initiated and terminated by a gating pulse comprising a bridge circuit having input and output terminals and a crystal connected in one leg thereof, gate means connected to the input terminal of said bridge, said gate means adapted to become non-conducting upon application of gating pulses to thereby excite the bridge to generate sinusoidal oscillations, delay means associated with the input of said gate whereby the pulse applied thereto may be delayed a predetermined time, means for amplifying the bridge output, negative feedback means connected between said amplifying means and said gate whereby when the gate becomes conducting the bridge oscillations are rapidly damped, positive feedback means connected between said amplifier and said bridge whereby the amplitude of said oscillations is maintained constant, means serving to generate damped oscillations in response to said gating pulse, and means serving to combine said bridge oscillations and said damped oscillations to produce oscillations free of distortion, said delay line serving to delay the generation of oscillations in the bridge circuit for a predetermined time whereby the phase relationship of the decaying oscillations and pulsed oscillations may be controlled.

7. A pulsed crystal oscillator of the type in which oscillations are initiated and terminated by a gating pulse comprising a bridge circuit having input and output terminals and a crystal connected in one leg thereof, gate means connected to the input terminal of said bridge, said gate means adapted to become non-conducting upon application of a gating pulse to thereby excite the bridge to generate sinusoidal oscillations, means for amplifying the bridge output, negative feedback means connected between said amplifying means and said gate means whereby when the gate becomes conducting the bridge oscillations are rapidly damped, positive feedback means connected between said amplifying means and said bridge whereby the amplitude of said bridge oscillations is maintained constant, a ringer circuit, gate means associated with said ringer circuit and adapted to receive said gating pulse, said gate serving to become non-conducting upon application of a gating pulse to excite said ringer circuit and generate damped sinusoidal oscillations, and means serving to add said amplified bridge oscillations and said damped oscillations to produce oscillations which are relatively free of distortion.

8. Apparatus as in claim 3 together with delay means serving to delay the application of bridge oscillations to the adding means whereby the phase relationship of the damped and bridge oscillations may be controlled.

9. Apparatus as in claim 6 together with a delay line connected to the input of the bridge gate serving to delay the application of pulses to the bridge whereby the pulse relationship of said bridge oscillations and said ringer damped oscillation may be controlled.

10. A pulsed crystal oscillator of the type in which the oscillations are initiated and terminated by gating pulses comprising a bridge circuit having input and output terminals and including a crystal connected in one leg thereof, gate means connected to the input terminals of said bridge, said gate means being responsive to said gating pulse to excite the bridge to generate sinusoidal oscillations, negative feedback means connected between the output of said bridge and the input gate whereby the bridge oscillations are rapidly damped upon application of a terminating gating pulse, means serving to generate damped sinusoidal oscillations, and means serving to add said bridge oscillations and said damped sinusoidal oscillations to produce oscillations free of distortion.

11. A pulsed crystal oscillator comprising a bridge circuit having input and output terminals and including a crystal in one leg thereof, means connected to the input of said bridge and adapted to excite the same to form sinusoidal oscillations, means for applying positive feedback to said bridge whereby the amplitude of said bridge output remains substantially constant, means serving to generate damped sinusoidal oscillations, and means serving to add said bridge oscillations and said damped oscillations to produce oscillations free of distortion.

References Cited in the file of this patent

UNITED STATES PATENTS

| | | |
|---|---|---|
| 2,422,612 | Mynall | June 1, 1948 |
| 2,448,543 | Moore | Sept. 7, 1948 |
| 2,454,132 | Brown | Nov. 16, 1948 |
| 2,697,172 | Szerlip | Dec. 14, 1954 |